United States Patent

[11] 3,609,194

[72] Inventor Gerard Ernest Gerhardt
Warren Township, Somerset County, N.J.
[21] Appl. No. 729,515
[22] Filed May 16, 1968
[45] Patented Sept. 28, 1971
[73] Assignee American Cyanamid Company
Stamford, Conn.

[54] POLYPHENYLEMETHYL PHOTOCHROMIC COMPOUNDS
5 Claims, No Drawings

[52] U.S. Cl. .......... 260/591,
260/335, 260/396, 260/668, 350/160, 252/300
[51] Int. Cl. .......... C07c 49/76
[50] Field of Search .......... 260/591

[56] References Cited
UNITED STATES PATENTS
3,075,015 1/1963 Meyer et al. .......... 260/591

*Primary Examiner*—Daniel D. Horwitz
*Attorney*—Samuel Branch Walker

ABSTRACT: A class of photochromic compounds characterized by the formula:

$$A-CH_2-B$$

wherein A is a moiety of an aromatic compound A—H having an efficient rate of intersystem crossing from the singlet state to the triplet state, and B is a moiety of a linear polyphenyl having the first triplet state below the first triplet state of A—H.

POLYPHENYLEMETHYL PHOTOCHROMIC COMPOUNDS

This invention relates to and has for its object the provision of a new class of photochromic organic compounds having the general formula (I):

$$A{-}CH_2{-}B$$
I wherein A is the moiety of an aromatic compound A–H having an efficient rate of intersystem crossing from the singlet state to the triplet state, and B is a moiety of a linear polyphenyl (B—H) having the first triplet state below (i.e., at lower energy than) the first triplet state of A—H. Also, the first excited singlet of B—H is advantageously above the first singlet state of A—H.

In the above, Compound AH, and moiety A derived therefrom, undergo a transition to the first excited singlet state upon exposure to light having a wavelength from 200–2,000 millimicrons. Compound AH, upon absorption of light in the stated range, must have a high intersystem crossing efficiency between the first excited singlet state and the lowest triplet state. Compound BH, from which moiety B is derived, must have a lowest triplet state at a lower energy level than the lowest triplet state of Compound AH; furthermore, the energy difference between the first triplet level and the higher triplet level of Compound BH must be different from the energy difference between the ground state and the first excited singlet state of Compound AH.

The advantages of photochromic compounds of this invention are: (1) rapid color development or change when irradiated by light and rapid color decay when the light is removed, and (2) increased intensity of the developed color due to great efficiency of energy transfer from one moiety to the other.

The compounds of this invention have many uses, such as in sunglasses, welding goggles, skylights, automobile windows and windshields, windows for buildings and dwellings, windows for space vehicles and aircraft, paints and surface coatings for novelty effects, energy measuring devices, etc.

The mechanism of the photochromic effect of the present invention requires that under light of a given wavelength, one fragment of the photochromic molecule "$A{-}CH_2{-}B$" absorbs and is "activated," while the other fragment is not so activated. The fragment which absorbs the incident light, known herein as the "donor" portion of the molecule, after absorption undergoes intersystem crossing from the excited singlet level to the triplet level and then transfers energy from its triplet level to the acceptor fragment.

The donor fragment, A, may be a complex system containing an acceptor moiety, B′ (which may or may not be the same as B), but still retaining the capability of donating energy to the acceptor moiety B. The acceptor fragment in its lowest triplet level absorbs light in the range of 200–2,000 millimicrons and is converted to a higher triplet state.

The acceptor fragment, B, may be a complex system containing a donor moiety, A′ (which may or may not be the same as A), but still retaining the capability of accepting energy from the donor moiety A.

The absorption of light by the acceptor fragment in its triplet state is observed as color, which disappears when the light source is removed. This is the photochromic effect. In essence, therefore, the present invention provides a means for converting the acceptor fragment to a form, namely its lowest triplet state, which is capable of absorbing light in the range of 200–2,000 millimicrons. The donor portion thus acts as an activator for the acceptor portion, so that the latter is converted to its light-absorbing triplet state.

In summary, a triplet-triplet photochromic system is obtained by incorporating in a nonopaque substrate, a compound having specific acceptor and specific donor moieties, neither one of the compounds corresponding to the said moieties having been expected to exhibit useful or substantial photochromism when used individually. One moiety (the acceptor) has a long-lived triplet state and an excited single state which does not convert readily into this triplet state. The other moiety (the donor) is easily converted from an excited singlet to a triplet of greater energy than the acceptor triplet. The energy of the donor triplet is efficiently transferred to the acceptor moiety, thereby forming the long-lived acceptor triplet. The absorption spectrum of the acceptor triplet is the source of photochromism. The excited singlet state of the donor is obtainable either by direct absorption of light or by transferal of energy from a more energetic excited singlet state of the donor or acceptor.

The present invention includes the use of compounds in which the acceptor moiety is deuterated. Deuterated derivatives exhibit first triplet states with longer lifetimes which will give a higher steady state concentration of molecules in this triplet state and may thus be preferred if the undeuterated compound does not give sufficient absorption intensity during exposure to light.

As will be noted, the compounds "AH" and "BH" and, consequently, the fragments "A" and "B," may be substituted by substituents such as alkyl radicals of one to 18 carbons, alkoxy radicals of one to 18 carbons, halo radicals (e.g., chlorine and fluorine), amino radicals such as dialkylamino groups, alkanamido groups, and the like. It may be desirable in many cases to have various substituents on the "A" or "B" fragment to aid in dissolving the photochromic compound in the substrate in which it is to be used, since some of the unsubstituted compounds are relatively insoluble in most conventional solvents. Long chain alkyl or alkoxy groups in many cases overcome this difficulty.

The compounds of this invention may be incorporated in nonopaque substrates capable of transmitting light in the range of 200 to 2,000 millimicrons. The nature of the substrate may vary considerably over a broad class of compositions ranging from fluids to solids. The solids may be either crystalline or amorphous, among the most suitable being glasses and polymeric materials.

The glasses include low temperature glasses derived from organic solvents, such as 2methyltetrahydrofuran, methylcyclohexane, and ether-pentane-alcohol, inorganic glasses such as phosphate glasses and borate glasses are also suitable. When liquid substrates are used, the lifetime of the "B" triplet level is usually short, so that the photochromic effect can be detected only instrumentally.

The polymeric materials which may be used in this invention include a wide range of polymeric materials which exist today. For many purposes, the polymeric material should have optical transparency. A lack is also desirable. The polymeric materials include thermoplastics such as polyacrylates, polymethacrylates, cellulose acetate, cellulose propionate, cellulose acetate-butyrate, cellulose nitrate, ethyl cellulose, polycarbonates, polyacrylonitrile, polyamides, polystrene, poly poly(methylstyrenes), poly(chloromethyl styrenes), poly(styrene-butadiene), poly(vinyl acetate), poly(vinyl acetals), poly(vinyl chloride), poly(vinyl butyral), poly(vinyl formal), chlorinated polyethers and silicones; and thermosetting resins such as phenol-formaldehyde condensates, melamine-formaldehyde condensates, polyester-styrene combination, polyurethanes, epoxies, and copolymers and mixtures thereof.

Triplet molecules are also known as biradicals because they possess two unpaired electrons. As such, they are extremely reactive and interact with each other, with oxygen, or with any paramagnetic species. Thus, it is advantageous to employ a polymeric matrix of good optical clarity that is free from residual monomer, plasticizers, and atoms, molecules, ions or molecular fragments capable of reacting rapidly with the metastable triplet state entities which govern the photochromic effects herein disclosed.

The photochromic material is uniformly dispersed throughout the plastic matrix. This can done by adding the compound to the monomer or monomers followed by polymerization; by dissolving the polymer and photochromic compound in a solvent and casting a rigid sheet, film or other form; by milling the photochromic combination of compounds with the polymeric material, etc. The photochromic compound can also be applied to the formed plastic article.

The photochromic effect is a function of the concentration of the photochromic compound, the thickness of the substrate and the intensity of the exciting radiation. Given adequate light intensity, the effect increases with increasing concentration and also increases with increasing thickness. For a given concentration and thickness, the effect increases with increasing light intensity up to the saturation value.

The amount of the photochromic compound to be used in the compositions of the invention may range from 0.0001 to 2.0 percent based on the amount of nonopaque substrate. In normal practice, at least 0.0001 percent, preferably at least 0.05 percent of the photochromic compound is employed.

A preferred class of compounds of this invention has the following formula (II):

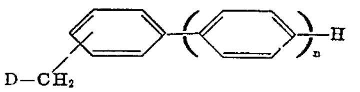

II wherein $n$ is an integer equal to or greater than 1, e.g., between 1 and 6 inclusive, and D is a moiety such as:

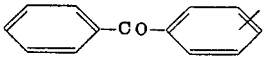

(Moiety of benzophenone),

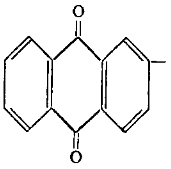

(Moiety of anthraquinone),

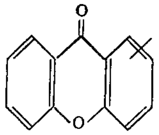

(Moiety of xanthone), and

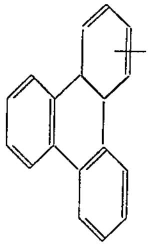

(Moiety of triphenylene)

The compounds of this invention may bear one or more inert substituents, such as alkyl, alkoxy, halo (e.g. chlorine, and fluorine), carboxy, alkoxycarbonyl, amino groups such as lower dialkylamino, amido groups such as alkanamido groups and the like.

The compounds of formula I can be prepared by conventional procedures. A convenient synthesis includes the steps of (1) reacting a carboxylic acid halide (formulae III and VII) with a hydrocarbon (formulae IV and VI according to reactants 1 and 2; and (2) reducing the resulting carbonyl compounds (formula V according to reaction 3).

(1) $$\underset{III}{A-CO-hal} + \underset{IV}{HB} \longrightarrow \underset{V}{A-CO-B} + H-hal$$

(2) $$\underset{VI}{A-H} + \underset{VII}{hal-CO-B} \longrightarrow \underset{V}{A-CO-B} + H-hal$$

(3) $$\underset{V}{A-CO-B} + [H] \longrightarrow \underset{I}{A-CH_2-B} + H_2O$$

When the compounds of formula I contain reducible groups, it may be desirable to introduce the reducible groups after the reduction step (reaction 3). Exemplary synthesis are shown below for compounds of formula II.

When "D" of formula II is a moiety of triphenylene, the compounds can be prepared by (1) reacting a triphenylenecarbonyl halide with a linear polyphenyl containing at least two phenyl rings in a Friedel-Crafts type of reaction using a catalyst such as aluminum chloride and (2) reducing the resulting polyphenylyl triphenylenyl ketone with an agent such as lithium aluminum hydride or hydrazine hydrate.

Suitable triphenylenecarbonyl halides include 2-triphenylenecarbonyl chloride, 2-triphenylenecarbonyl bromide, 1-triphenylenecarbonyl chloride, etc.,; and suitable polyphenyls include biphenyl, 4methylbiphenly, 4-ethylbiphenyl, 4-isopropylbiphenyl, 4-methoxybiphenyl, 4-chlorobiphenyl, 4fluorobiphenyl, p-terphenyl, 4-methyl-p-terphenyl, 3,5-dichloro-p-terphenyl, 4-fluoro-p-terphenyl, p-quarterphenyl, 2,2'''-dimethyl-p-quarterphenyl, 4-methyl-p-quarterphenyl, p-quinquephenyl, 2,2''''-dimethyl-p-quinquephenyl, etc.

When "D" of formula II is a moiety of benzophenone, the compounds can be prepared by (1) reacting a halobenzoyl halide with a linear polyphenyl containing at least two phenyl rings in a Friedel-Crafts type of reaction using a catalyst such as aluminum chloride, (2) reducing the resulting halobenzoylpolyphenyl with an agent such as lithium aluminum hydride or hydrazine hydrate, (3) reacting the resulting halobenzylpolyphenyl with cuprous cyanide, and (4) reacting the resulting cyanobenzylopolyphenyl with a phenylmagnesium halide in a Grignard type of reaction followed by hydrolysis with water.

Suitable halobenzoyl halides include p-chlorobenzoyl chloride, p-bromobenzoyl bromide, p-chlorobenzoyl bromide, m-chlorobenzoyl chloride, 4-chloro-m-toluoyl chloride, etc.; and suitable polyphenyls include those listed above under the synthesis of triphenylene derivatives.

Suitable phenylmagnesium halides include phenylmagnesium bromide, phenylmagnesium chloride, p-tolylmagnesium bromide, p-methoxyphenylmagnesium bromide, p-chlorophenylmagnesium bromide, biphenylylmagnesium chloride, etc.

When "D" of formula II is a moiety of anthraquinone, the compounds can be prepared by (1) reacting an anthracenecarbonyl halide with a linear polyphenyl containing at least two phenyl rings in a Friedel-Crafts type of reaction using a catalyst such as aluminum chloride, (2) reducing the resulting anthryl polyphenylyl ketone with an agent such as lithium aluminum hydride or hydrazine hydrate and (3) oxidizing the resulting polyphenylylmethylanthracene with an oxidizing agent, such as chromic oxide or nitric acid.

Suitable anthracenecarbonyl halides for the foregoing include 2-anthracenecarbonyl chloride, 1-methoxy-2-anthracenecarbonyl chloride, etc.; and suitable polyphenyls include those listed above under the synthesis of triphenylene compounds.

When "D" of formula II is a moiety of xanthone, the compounds can be prepared by (1) reacting a linear polyphenylcarbonyl halide having at least two phenyl rings with a xanthene in a Friedel-Crafts type of reaction using a catalyst such as aluminum chloride, (2) reducing the resulting polyphenylyl xanthenyl ketone with an agent such as lithium aluminum hydride or hydrazine hydrate, (3) and oxidizing the resulting polyphenylylmethylxanthene with an oxidizing agent, such as chromic oxide or potassium permanganate.

Suitable polyphenylcarbonyl halides include 4-biphenylcarbonyl chloride, 3-biphenylcarbonyl chloride, 4'-methyl-4-biphenylcarbonyl chloride 6-3-biphenylcarbonyl chloride, 4'-chloro-4-biphenylcarbonyl chloride, 3-chloro-3-biphenylcarbonyl chloride, 4'-methoxy-4-biphenylcarbonyl chloride, p-terphenyl-4-carbonyl chloride, p-terphenyl-3-carbonyl chloride, p-quaterphenyl-4-carbonyl chloride, etc.; and suitable xanthenes include xanthene, 2-methylxanthene, 2,3-dimethylxanthene, etc.

The above carbonyl halides are made by conventional methods.

Representative products of formula II which can be made by the procedures outlined above are shown in the following examples which are intended to illustrate further the present invention.

EXAMPLE 1

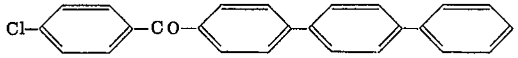

To a solution of 43.0 g. (0.2 mole p-terphenyl and 35.0 (0.2 mole) p-chlorobenzoyl chloride in 1,500 ml. carbon disulfide at room temperature, there is added 33 g. (0.25 mole) aluminum chloride over a 20-minute period. After the reaction mixture is stirred for 28 hours, it is poured into a mixture of 600 g. ice and 500 ml. concentrated hydrochloric acid. The carbon disulfide is then evaporated from the mixture. The precipitated product is separated by filtration and dried. The product, 4-(4-chlorobenzoyl)-p-terphenyl, melts at 273.2–273.8° C. after crystallization from dimethylformamide.

When the procedure is repeated substituting equivalent amounts of biphenyl, p-quaterphenyl or p-quinquephenyl for the p-terphenyl, the products are 4-(4-chlorobenzoyl)biphenyl, 4-(4-chlorobenzoyl)-p-quaterphenyl and 4-(4-chlorobenzoyl)-p-quinquephenyl, respectively.

When the procedure is repeated substituting 4-chloro-m-toluoyl chloride for the p-chlorobenzoyl chloride, the product is 4-(4-chloro-m-toluoyl)-p-terphenyl.

EXAMPLE 2

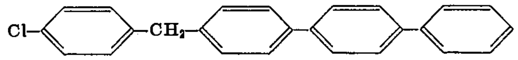

To a mixture of 50 ml. ethyl ether, 5.15 g. (0.0385 mole) aluminum chloride and 0.625 g. (0.0193 mole) lithium aluminum hydride, there is added 3.70 g. (0.01 mole) 4-(4-chlorobenzoyl)-p-terphenyl (product of example 1) over a 15-minute period. After a reflux period of 30 minutes, the excess lithium hydride is decomposed by cautiously adding ethyl acetate until there is no further reaction. Water is then carefully added until there is no further reaction. After addition of about 100 ml. 6N sulfuric acid, the organic solvent is removed by evaporation and the precipitate is separated by filtration and dried. After purification by solution in methylene chloride, extraction of the solution with aqueous sodium bicarbonate, evaporation of the solvent and recrystallization from glacial acetic acid, the product, 4-(4-chlorobenzyl)-p-terphenyl, melts at 199°–200° C.

When the procedure is repeated substituting equivalent amounts of 4-(4-chlorobenzoyl)biphenyl, 4-(4-chlorobenzoyl)-p-quarterphenyl or 4-(4-chlorobenzoyl)-p-quinquephenyl for the 4-(4-chlorobenzoyl)-p-terphenyl, the products are 4-(4-chlorobenzyl)biphenyl, 4-(4-chlorobenzyl)-p-quarterphenyl and 4-(4-chlorobenzyl)-p-quinquephenyl, respectively.

When the procedure is repeated substituting equivalent amounts of 4-(4-chloro-m-toluoyl)-p-terphenyl for the 4-(4-chlorobenzoyl)-p-terphenyl, the product is 4-(4-chloro-3-methylbenzyl)terphenyl.

EXAMPLE 3

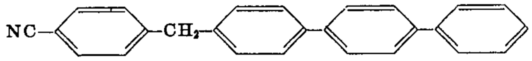

A mixture of 5.0 g. (0.0141 mole) 4-(4-chlorobenzyl)-p-terphenyl (product of example 2), 1.8 g. (0.02 mole) cuprous cyanide and 2 ml. pyridine is heated at 225°–235° C. for 50 hours. The reaction mixture is cooled, treated with about 50 ml. 5N sodium hydroxide solution and 50 ml. chloroform and boiled. After filtering, the extraction process is repeated. The combined chloroform extracts are shaken twice with 6N hydrochloric acid and once with saturated sodium chloride solution. Evaporation of the solvent gives a material which, after purification by chromatography on a silica gel column and recrystallization from benzene, melts at 234.5°–235° C. The product is 4-(4-cyanobenzyl)-p-terphenyl.

When the procedure is repeated substituting equivalent amounts of 4-(4-chlorobenzyl)biphenyl, 4-(4-chlorobenzyl)-p-quaterphenyl or 4-(4-chlorobenzyl)-p-quinquephenyl for the 4-(4-chlorobenzyl)-p-terphenyl, the products are 4-(4-cyanobenzyl)biphenyl, 4-(4cyanobenzyl)-p-quaterphenyl, and 4-(4-cyanobenzyl)-p-quinquephenyl, respectively.

When the procedure is repeated substituting equivalent amounts of 4-(4-chloro-3-methylbenzyl)-p-terphenyl for the 4-(4-chlorobenzyl)-p-terphenyl, the product is 4-(4-cyano-3-methylbenzyl)-p-terphenyl.

EXAMPLE 4

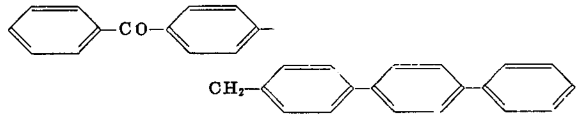

To a solution of 5.4 g. (0.0157 mole) 4-(4cyanobenzyl)-p-terphenyl (product of example 3) in 25 ml. benzene, there is added 5.4 g. of a 3-molar solution of phenylmagnesium bromide in ether. After the reaction mixture has been refluxed for 16 hours and cooled, a white precipitate is separated by filtration and washed with hot benzene. The material is hydrolyzed with saturated aqueous ammonium chloride solution and sufficient benzene and ethyl acetate are added to dissolve all the solid material. Separation of the organic solvents from the aqueous fraction and evaporation of the solvents yields a pale yellow crystalline solid. A suspension of the solid in 120 ml. toluene, 70 ml. dioxane and 100 ml. 25 percent by volume sulfuric acid is refluxed for several hours. To the cooled reaction mixture, methylene chloride and ethyl acetate are added to dissolve all the solid material. After separation of the aqueous fraction, the organic solution is washed with aqueous bicarbonate and water. Evaporation of the solvent leaves a crystalline solid which, after recrystallization from ethyl acetate, appears as colorless flakes melting at 212° C. The product is 4-p-terphenyl-4-ylmethyl) benzophenone.

When the procedure is repeated substituting equivalent amounts of 4-(4-cyanobenzyl)biphenyl, 4-(4-(4-cyanobenzyl)-p-quaterphenyl or 4-(4-cyanobenzyl)-p-quinquephenyl for the 4-(4-cyanobenzyl)-p-terphenyl, the products are 4-(4-biphenylylmethyl)benzophenone, (4-p-quarterphenyl-4-ylmethyl)benzophenone and 4-(p-quinquephenyl-4-ylmethyl)benzophenone, respectively.

When the procedure is repeated substituting an equivalent amount of 4-(4-cyano-3-methylbenzyl)-p-terphenyl for the 4-(4-cyanobenzyl)-p-terphenyl, the product is 3-methyl-4-(p-terphenyl-4-ylmethyl)benzophenone.

When the procedure is repeated substituting equivalent amounts of p-methoxyphenylmagnesium bromide or p-chlorophenyl-magnesium bromide for the phenylmagnesium bromide, the products are 4′-methoxy-4-(p-terphenyl-4-ylmethyl)benzophenone and 4′-chloro-4-(p-terphenyl-4-ylmethyl)benzophenone, respectively.

EXAMPLE 5

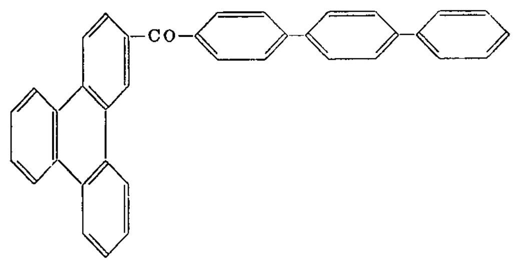

A mixture of 5.82 g. (0.02 mole) 2-triphenylenecarbonyl chloride, 4.6 g. (0.02 mole) p-terphenyl 4.0 g. (0.03 mole) aluminum chloride, 150 ml. carbon disulfide and 150 ml. nitrobenzene is stirred while heating on a steam bath with removal of the carbon disulfide by distillation. Hydrogen chloride is evolved. After about 3.5 hours on the steam bath, 100 ml. 5N hydrochloric acid is added and the nitrobenzene is removed by steam distillation. A yellow-brown precipitate is recovered by filtration, and is washed with aqueous ammonium hydroxide, methanol and ether. The precipitate is extracted with chloroform and the chloroform solution is chromatographed on alumina, eluting first with benzene, then with benzene-chloroform and finally with chloroform. Evaporation of the solvents gives a material which, after crystallization from chloroform-ethyl acetate, appears as nearly white crystals melting at 243°–244.5° C. The product is p-terphenyl-4yl 2-triphenylenyl ketone.

When the procedure is repeated substituting equivalent amounts of biphenyl, 4-methylbiphenyl, p-quarterphenyl or p-quinquephenyl for the p-terphenyl, the products are 4-biphenylyl 2-triphenylenyl ketone, 4'-methyl-4-biphenylyl 2-triphenylenyl ketone, p-quarterphenyl4yl 2-triphenylenyl ketone and p-quinquephenyl-4yl 2-triphenylenyl ketone, respectively.

EXAMPLE 6

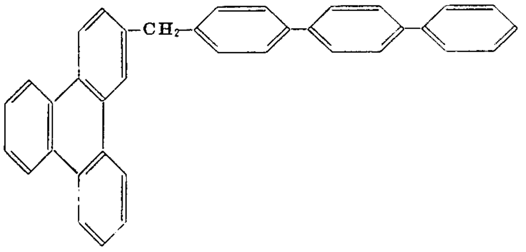

A mixture of 0.6 g. (0.00127 mole) p-terphenyl-4yl 2-triphenylenyl ketone (product of example 5), 10.0 ml. diethylene glycol, 2 ml. hydrazine hydrate and 1.0 g. potassium hydroxide is heated for 1 hour on a steam bath. After removing water by distillation, the mixture is refluxed for 2 hours. The solid material, obtained by adding water, acidifying and filtering, is recrystallized from tetrahydrofuran. The product, 2-(p-terphenyl-4-ylmethyl)triphenylene, melts at 267.5°–268° C.

When the procedure is repeated substituting equivalent amounts of 4-biphenylyl 2-triphenylenyl ketone, 4'-methyl-4-biphenylyl 2-triphenylenyl ketone, p-quarterphenyl-4yl 2-triphenylenyl ketone or p-quinquephenyl-4yl 2-triphenylenyl ketone, the products are 2-(4-biphenylylmethyl)triphenylene, 2-(4'4-biphenylylmethyl)triphenylene, 2-(p-quarterphenyl-4-ylmethyl)triphenylene and 2-(p-quinquephenyl-4-ylmethyl)triphenylene, respectively.

EXAMPLE 7

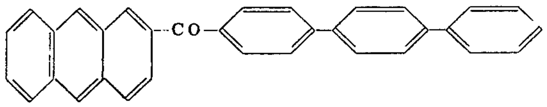

The procedure of example 5 is repeated substituting an equivalent amount of 2-anthracenecarbonyl chloride for the 2-triphenylenecarbonyl chloride. The product is 2-anthryl p-terphenyl-4yl ketone.

When the above procedure is repeated substituting p-quarterphenyl or p-quinquephenyl for the p-terphenyl, the products are 2anthryl p-quarterphenyl-4yl ketone and 2-anthryl p-quinquephenyl-4yl ketone, respectively.

EXAMPLE 8

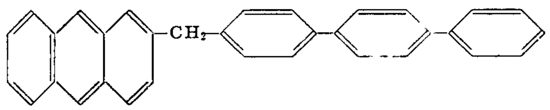

The procedure of example 6 is repeated substituting an equivalent amount of 2-anthryl p-terphenyl-4yl ketone (product of example 7) for the p-terphenyl-4yl 2-triphenylenyl ketone; the product is 2-(p-terphenyl-4-ylmethyl)anthracene.

When the above procedure is repeated substituting equivalent amounts of 2-anthryl p-quarterphenyl-4yl ketone or 2-anthryl p-quinquephenyl-4yl ketone for the 2-anthryl P-terpheny-4-yl ketone, the products are 2-(p-quarterphenyl-4-ylmethyl)anthracene and 2-(p-quinquephenyl-4-ylmethyl)anthracene, respectively.

EXAMPLE 9

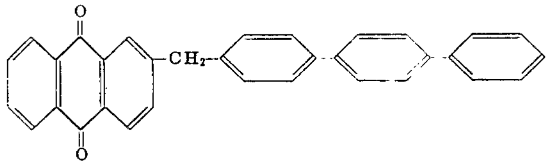

2-(p-Terphenyl-4-ylmethyl)anthracene (product of example 8) is oxidized by reaction with excess chromic oxide in glacial acetic acid according to the general procedure of *J. Pr. Chem.* [2]79, 560. The product is 2-(p-terphenyl-4-ylmethyl)anthraquinone.

When the procedure is repeated substituting equivalent amounts of 2-(p-quarterphenyl-4-ylmethyl)anthracene or 2-(p-quinquephenyl-4-ylmethyl)anthracene for the 2-(p-quarterphenyl-4-ylmethyl)anthraquinone and 2-(p-quinquephenyl-4-ylmethyl)anthraquinone, respectively.

EXAMPLE 10

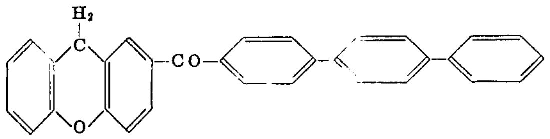

The general procedure of example 5 is repeated substituting equivalent amounts of p-terephenyl-4-carbonyl chloride and xanthene for the 2-triphenylenecarbonyl chloride and terphenyl, respectively. The product is pp-terphenyl-4yl 2-xanthenyl ketone.

When the above procedure is repeated substituting equivalent amounts of biphenyl-4-carbonyl chloride, p-quarterphenyl-4-carbonyl chloride or p-quinquephenyl-4-carbonyl chloride for the p-terphenyl-4-carbonyl chloride, the products are 4-biphenyl 2-xanthenyl ketone, p-quarterphenyl-4yl 2-xanthenyl ketone, and p-quinquephenyl-4yl 2-xanthenyl ketone, respectively.

EXAMPLE 11

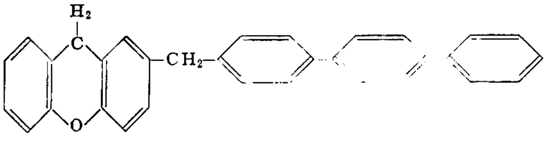

The general procedure of example 6 is repeated substituting an equivalent amount of p-terphenyl-4yl 2-xanthenyl ketone (product of example 10) for the p-terphenyl-4yl 2-triphenyl ketone. The product is 2p-terphenyl-4-ylmethyl)xanthene.

When the above procedure is repeated substituting equivalent amounts of 4-biphenylyl 2-xanthenyl ketone, p-quarterphenyl-4yl 2-xanthenyl ketone or p-quinquephenyl-4yl 2-xanthenyl ketone for the p-terphenyl-4yl 2-xanthenyl ketone, the products are 2-(4-biphenylylmethyl)xanthane, 2-(p-quarterphenyl-4ylmethyl)xanthene and 2p-quinuephenyl-4-ylmethyl)xanthene, respectively.

EXAMPLE 12

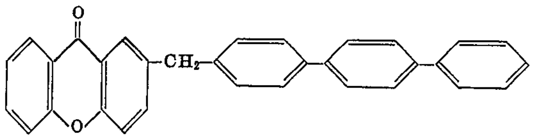

2-(p-terephenyl-4-ylmethyl)xanthene is oxidized by reaction with excess chromic acid in glacial acetic acid according to the general procedure of Ber. 47, 1158. The product is 2-(p-terphenyl-4-ylmethyl)xanthone.

When the procedure is repeated substituting equivalent amounts of 2-(4-biphenylylmethyl)xanthene, 2-(p-quaterphenyl 4-ylmethyl)xanthene or 2-(p-quinquephenyl-4-ylmethyl)xanthene for the 2-(p-terphenyl-4-ylmethyl)xanthene, the products are 2-(4-biphenylylmethyl)xanthone, 2-(p-quaterphenyl-4-ylmethyl)xanthanone and 2-(p-quinquephenyl-4-ylmethyl)xanthone, respectively.

EXAMPLE 13

To a solution of 0.1 g. 4-(p-terphenyl-4-ylmethyl)benzophenone (product of example 4) in a mixture of about 46.5 g. inhibitor-free methyl methacrylate monomer and about 2.5 g. ethylene dimethacrylate, there is added 0.01 percent of azobisisobutyronitrile, based on the weight of the monomer. After degassing to a pressure equivalent to less than $10^{15}$ mm. of mercury, polymerization is allowed to take place in a cylindrical mold, first at 50° C. for 12 hours and then at 80° C. for 72 hours. The rough cylinder of poly(methyl methacrylate) is machined to a right cylinder 4 cm. long × 2 cm. diameter. The ends of the cylinder are polished to provide an optical finish.

When exposed to sunlight or the radiation of an RS-type sunlamp, the polymer changes from colorless to yellow. When the polymer cylinder is illuminated coaxially with a 250-joule flash from an unfiltered xenon discharge, the cylinder is opaque along the 4-cm. dimension to radiation from 3,800 A. to 5,400 A. for 100 microseconds after the peak of the flash. The mean lifetime of the coloration is about one second at room temperature.

EXAMPLE 14

A $10^{15}$ molar solution of p-terphenyl-4-ylmethyltriphenylene (product of example 6) in methylcyclohexane is freed of oxygen by repeatedly shaking in an atmosphere of argon. The solution is transferred to an optical cell (approximately 1 cm. in dia. × 14 cm. long). When the cell is illuminated coaxially by a 250-joule flash, a very strong transient absorption appears at about 4,625 A.

I claim:

1. A compound having the formula

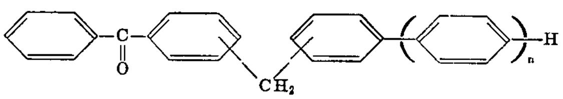

where $n$ is an integer from 1 to 6.

2. A compound, according to claim 1, which is 4-(-(-*terphenyl*-4-ylmethyl)benzophenone.

3. A compound, according to claim 1, which is 4-(4-biphenylylmethyl)benzophenone.

4. A compound, according to claim 1, which is 4-(p-quaterphenyl-4-ylmethyl)benzophenone.

5. A compound, according to claim 1, which is 4-(p-quinquephenyl-4-ylmethyl)benzophenone

UNITED STATES PATENT OFFICE
CERTIFICATE OF CORRECTION

Patent No. 3,609,194 Dated September 28, 1971

Inventor(s) GERARD ERNEST GERHARDT

It is certified that error appears in the above-identified patent and that said Letters Patent are hereby corrected as shown below:

Column 1, line 75, "single" should read -- singlet --.

Column 2, line 48, after "lack" insert -- of color --.

Column 2, line 53, "polystrene" should read -- polystyrene --.

Column 2, line 54, omit first "poly".

Column 3, line 63, "reactants" should read -- reactions --.

Column 4, line 16, "4fluorobiphenyl" should read -- 4-fluorobiphenyl --.

Correct the spelling of "p-quaterphenyl" in all of the following places:

Column 4, line 17
Column 4, line 18
Column 4, line 18
Column 5, line 55
Column 5, line 58
Column 6, line 51
Column 7, line 19
Column 7, line 23
Column 7, line 54
Column 7, line 58
Column 7, line 74-75
Column 8, line 1
Column 8, line 18
Column 8, line 20
Column 8, line 41
Column 8, line 43

UNITED STATES PATENT OFFICE
CERTIFICATE OF CORRECTION

Patent No. 3,609,194 Dated September 28, 1971

Inventor(s) GERARD ERNEST GERHARDT

It is certified that error appears in the above-identified patent and that said Letters Patent are hereby corrected as shown below:

Correct the spelling of "p-quaterphenyl" - continued.

Column 8, line 61
Column 8, line 65
Column 9, line 8
Column 9, line 10
Column 9, line 29
Column 9, line 32
Column 10, line 39

Correct "4yl" to read -- 4-yl -- in the following places

Column 7, line 23
Column 7, line 24
Column 7, line 43
Column 7, line 54
Column 7, line 55
Column 7, line 73
Column 8, line 1
Column 8, line 2
Column 8, line 13
Column 8, line 14
Column 8, line 18
Column 8, line 19
Column 8, line 59
Column 8, line 65
Column 8, line 66
Column 9, line 2
Column 9, line 3
Column 9, line 8
Column 9, line 9

FORM PO-1050 (10-69)

USCOMM-DC 60376-P69
☆ U.S. GOVERNMENT PRINTING OFFICE : 1969 O—366-334

UNITED STATES PATENT OFFICE

CERTIFICATE OF CORRECTION

Patent No. 3,609,194 Dated September 28, 1971

Inventor(s) GERARD ERNEST GERHARDT

It is certified that error appears in the above-identified patent and that said Letters Patent are hereby corrected as shown below:

Correct "4yl" to read -- 4-yl -- continued

Column 9, line 10

Column 4, line 28, "cyanobenzylopolyphenyl" should read -- cyanobenzylpolyphenyl --.

Column 4, line 67, "6-3-biphenylcarbonyl" should read -- 6-methyl-3-biphenylcarbonyl --.

Column 5, line 11 (0.2 mole p-" should read -- (0.2 mole) p- --.

Column 5, line 43 "lithium hydride" should read -- lithium aluminum hydride --.

Column 6, line 11 "(4cyanobenzyl)" should read -- (4-cyanobenzyl) --.

Column 6, line 25 "(4cyanobenzyl)" should read -- (4-cyanobenzyl) --.

Column 6, line 47 "4-(4-(4-" should read -- 4-(4- --.

Column 7, line 57 "2-(4'4-biphenylylmethyl)tri" should read -- 2-(4'-methyl-4-biphenylylmethyl)tri --.

Column 8, line 1 "2anthryl" should read -- 2-anthryl --.

Column 8, lines 19-20 "p-terpheny" should read -- p-terphenyl -

UNITED STATES PATENT OFFICE

CERTIFICATE OF CORRECTION

Patent No. 3,609,194 Dated September 28, 1971

Inventor(s) GERARD ERNEST GERHARDT

It is certified that error appears in the above-identified patent and that said Letters Patent are hereby corrected as shown below:

Page 4

Column 8, line 56 "terephenyl" should read -- terphenyl --.

Column 8, line 59 "pp-terphenyl" should read -- p-terphenyl --

Column 9, line 4 "2p" should read -- 2-(p- --.

Column 9, line 10 "2p" should read -- 2-(p- --.

Column 9, line 23 "terephenyl" should read -- terphenyl --.

Column 10, line 2 "$10^{15}$" should read -- $10^{-5}$ --.

Column 10, line 19 "$10^{15}$" should read -- $10^{-5}$ --.

Column 10, line 34 "4-(-(-" should read -- 4-(p- --.

Signed and sealed this 25th day of April 1972.

(SEAL)
Attest:

EDWARD M.FLETCHER,JR.
Attesting Officer

ROBERT GOTTSCHALK
Commissioner of Patents